(12) United States Patent
Kazemi-Nia

(10) Patent No.: US 7,212,041 B2
(45) Date of Patent: May 1, 2007

(54) WEIGHTED MULTI-INPUT VARIABLE GAIN AMPLIFIER

(75) Inventor: Mehdi Kazemi-Nia, Los Angeles, CA (US)

(73) Assignee: Intel Corporation, Santa Clara, CA (US)

( * ) Notice: Subject to any disclaimer, the term of this patent is extended or adjusted under 35 U.S.C. 154(b) by 790 days.

(21) Appl. No.: 10/329,276

(22) Filed: Dec. 23, 2002

(65) Prior Publication Data

US 2004/0119477 A1 Jun. 24, 2004

(51) Int. Cl.
*G01R 3/45* (2006.01)

(52) U.S. Cl. .............................. 327/58; 327/62; 327/74

(58) Field of Classification Search ...................... None
See application file for complete search history.

(56) References Cited

U.S. PATENT DOCUMENTS

| | | | | |
|---|---|---|---|---|
| 5,467,046 A | * | 11/1995 | Kimura | 327/351 |
| 5,471,166 A | * | 11/1995 | Kimura | 327/351 |
| 5,475,328 A | * | 12/1995 | Kimura | 327/351 |
| 5,489,868 A | * | 2/1996 | Gilbert | 327/351 |
| 5,506,537 A | * | 4/1996 | Kimura | 327/351 |
| 5,563,893 A | | 10/1996 | Lai | |
| 6,222,652 B1 | | 4/2001 | Roberts | |
| 6,731,918 B1 | * | 5/2004 | Kaneki | 455/226.1 |
| 2002/0051271 A1 | | 5/2002 | Yoshikoshi | |

FOREIGN PATENT DOCUMENTS

EP 0 926 846 A2 6/1999

\* cited by examiner

*Primary Examiner*—Tuan T. Lam
(74) *Attorney, Agent, or Firm*—Kevin Reif

(57) ABSTRACT

A limiting amplifier (LIA), used for example in high speed optical communication systems, includes a loss of signal (LOS) feature that may provide improved optical receiver performance and includes wide range user-programmable thresholds for generating analog loss of signal (LOS) alarms. In particular, multiple sampling points within the limiting amplifier may be used. These samples may be differentially amplified with weighted gains and then combined and compared to a threshold value to generate an LOS alarm signal.

26 Claims, 2 Drawing Sheets

WEIGHTED MULTI-INPUT VARIABLE GAIN AMPLIFIER

FIELD OF THE INVENTION

An embodiment of the present invention relates to gain amplifiers and, more particularly, to multiple input gain amplifiers that can detect loss of signal (LOS) over a wide threshold range.

BACKGROUND INFORMATION

In high speed digital communication systems, it is important to be able to rapidly and reliably determine the loss of an incoming signal transmitted to a receiver circuit over the communication channel of a communication system. Accordingly, receiver chip sets or chips are often provided with circuitry which is adapted to monitor a signal level of the incoming signal of the digital data bit stream or data stream to determine whether the data stream is present or not and provide a Loss of Signal (LOS) detect signal indicating whether the data stream is present or absent. Often, this LOS detect signal is transferred to a system processor or network controller running a suitable monitoring program, monitoring the operation of the communication system, which may be adapted to take corrective steps in response to an activated LOS detect signal.

In fast optical data network environments when receiving an optical signal from an optical fiber, a photodiode is used to translate the signal from the optical domain to the electrical domain. A transimpedance amplifier (TIA) is often used to thereafter translate an electrical current received from the photodiode to an electrical voltage. Since the typical output voltage of most TIAs is considerably less than 100 mV, a limiting amplifier is required to square up the signal and amplify it to a level that can be clocked and interpreted by a data recovery unit. Many physical media device (PMD) receiver chipsets typically implement the LOS detect or alarm feature in the Limiting Amplifier (LIA). Customer specifications may need to set the threshold of LOS from as low as 5 mV to the upper range of 200 mV. Unfortunately, present LIAs have difficulties meeting this wide input range.

DETAILED DESCRIPTION

A limiting amplifier (LIA), used for example in high speed optical communication systems, includes a loss of signal (LOS) feature that may be programmed over a wide range user-programmable thresholds for generating loss of signal (LOS) alarms. In particular, multiple sampling points within the limiting amplifier may be used. These samples may be differentially amplified with weighted gains and then combined and compared to a threshold value to generate an LOS alarm signal.

Limiting amplifiers (LIAs) offer high gain over a wide bandwidth and are ideal for use as a post amplifier in fiber-optic receivers with high data rates. LIAs may interface directly to the transimpedance amplifier (TIA) of a typical optical-to-electrical conversion portion of a fiber optic link. The amplitude of a signal output from a TIA may vary over time as well as contain a certain amount of noise. A feature of the LIA is to quantize the output signal and output a waveform that is voltage-limited.

Figure 1:
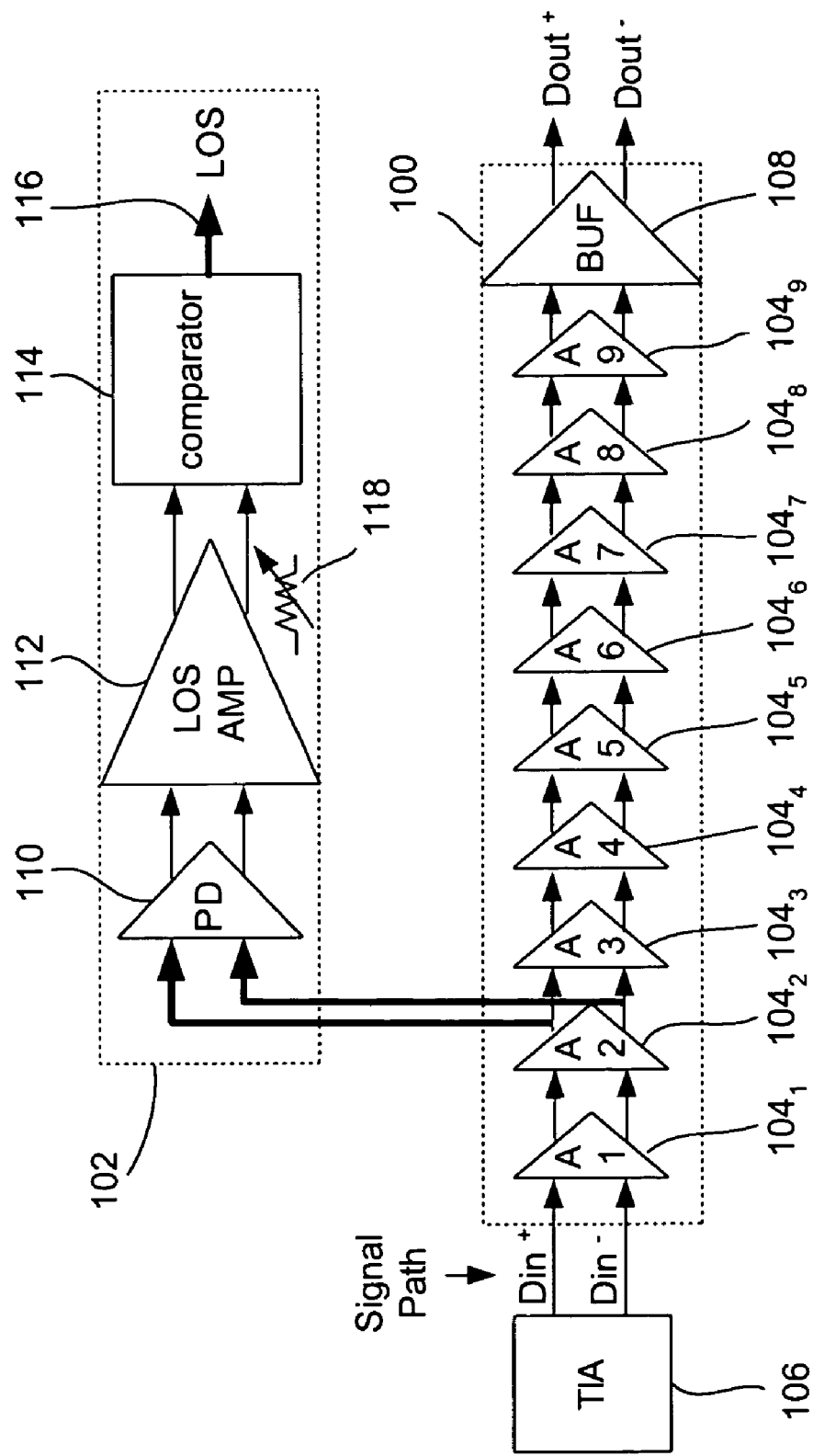
FIG. 1 is a limiting amplifier having a conventional loss of signal (LOS) scheme.

Referring now to FIG. 1, there is shown a limiting amplifier (LIA) having a conventional LOS detection scheme. In particular, an LIA 100 includes LOS detection circuitry 102. The LIA 100 comprises a chain of amplifier stages $104_{1-9}$ connected in series. In this example, nine amplifier stages are shown labeled A1–A9. In operation, a TIA 106 outputs an electrical current signal $D_{in}^{+}$ and $D_{in}^{-}$ (herein after referred to simply as $D_{in}$). This may be a weak current signal resulting from a data stream in the optical domain converted into the electrical domain. The signal enters the LIA 100 where it is amplified by the plurality of amplifier stages A1–A9. After each amplifier stage A1–A9 a voltage signal may be output with some level of gain until saturation is reached, saturation being the point at which the voltage limit has been reached. Buffer 108 subsequently buffers the signal after which may be further processed by clock and data recovery circuitry (not shown).

The LOS circuitry 102 may comprise a peak detector (PD) 110, an amplifier 112, and a comparator 114. In the traditional design, the peak detector samples one point in the amplifier chain 104 and a simple logic block comprising the amplifier 112 and comparator 114 generates the LOS alarm signal 116. If, after amplification 112, the signal entering the peak detector 110 is below a reference voltage threshold, the comparator 114 generates a LOS alarm signal 116. For each particular application, the sensitivity of the LOS alarm needs to be set. This may be accomplished by a simple variable resistor 118 located in the LOS circuitry 102 that changes the threshold of the comparator 114 or changes the gain of the LOS amplifier 112. Both options are effective for example if the range is 5 mv to 10 mv or 100 mv to 200 mv, but not effective over a wide dynamic range.

There are several reasons for this lack of wide dynamic range. First, peak detection is nonlinear and as a result it requires large enough amplitude to detect peak signals accurately. If the peak detector 110 samples the signal in early in the amplifier stages (as shown), the signal amplitude may be insufficient to be accurately detected. In this case the LOS threshold could not be set in the lower range. On the other hand, if peak detector 110 samples the signal at the end of the chain (for example after A7), the LOS circuitry 102 cannot discriminate large input amplitude variation because of the limiting nature of the LIA 100. That is, there is no difference between 150 mV and 200 mV signal if the LOS block samples the signal at the end of the amplifier chain 104 since saturation (i.e., the voltage limit) may already have been reached.

One embodiment of the present invention is directed to a device that provides improved optical receiver performance and includes a user-programmable threshold for generating analog loss of signal (LOS) alarms.

Figure 2:
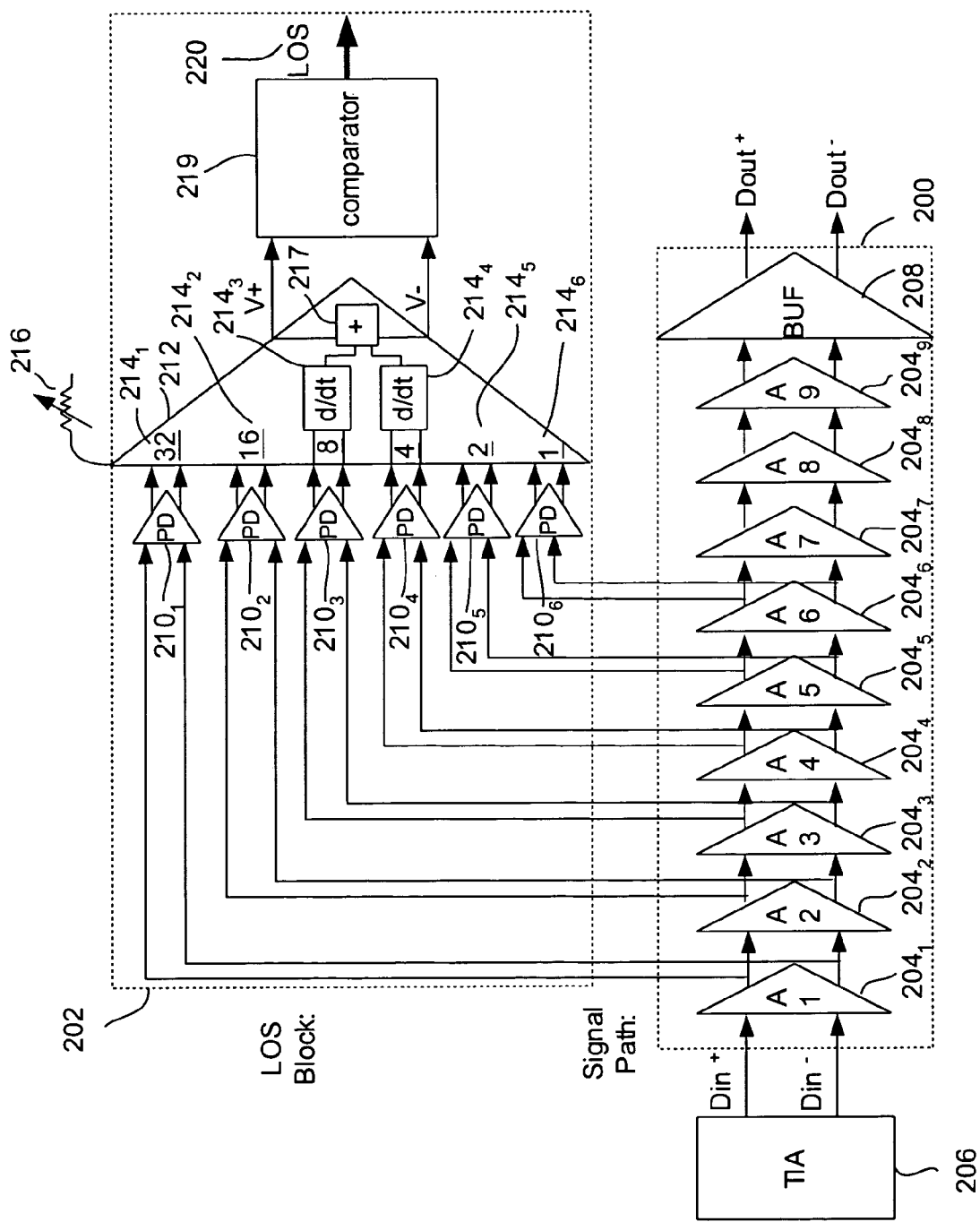
FIG. 2 is a limiting amplifier having a LOS feature that utilizes weighted multiple inputs for providing wide range of user-programmable LOS thresholds according to an example embodiment.

FIG. 2 shows a limiting amplifier (LIA) having a loss of signal (LOS) feature according to one embodiment of the invention. As before, the LIA amplifier 200 includes loss of signal (LOS) circuitry 202. The LIA 200 may comprise a chain of amplifier stages $204_1$–$204_9$ connected in series to progressively amplify an input signal Din. Here, nine amplifier stages $204_{1-9}$ are shown labeled A1–A9. Of course this is by way of example only as any number of stages are possible. In operation, the TIA 206 outputs an electrical current signal Din+ and Din−. This may be a weak current signal resulting from a data stream in the optical domain converted into the electrical domain. The signal enters the LIA 200 where it is amplified by the plurality of amplifier stages A1–A9. After each amplifier stage A1–A9 a voltage signal may be output with some level of gain until saturation is reached, saturation being the point at which the voltage limit of the LIA 200 has been reached. A buffer 208 subsequently buffers the signal after which it may be further processed by clock and data recovery circuitry (not shown).

The loss of signal (LOS) circuitry 202 comprises weighted multiple inputs and provides an effective method to detect loss of signal with a wide threshold range. As shown in FIG. 2, the LOS circuitry 202 comprises a plurality of peak detectors (PD) $210_1$–$210_6$, each of which are connected to sample a different point in the amplifier chain A1–A6. Again, these sampling points are examples and one skilled in the art will recognize that other points may also be suitable. For example, the detection points may be after only A1, A2, and A3, or after A1, A2, A4, and A5, skipping A3, or any other combination. In addition, ones of the peak detectors or sampling points may be selected (i.e., switched on or off) to provide a method of effectively adding or deleting certain sampling points depending on the desired LOS threshold.

Each of the PDs $210_1$–$210_6$ serves as an input to a weighted multiple input amplifier 212. Embodiments of the invention incorporate different sampling points such that ones of the peak detectors (PD) 210 can sample the signal anywhere in the signal path (A1–A9). As shown, six PDs 210 are employed in this example embodiment. As a result, they can sample the signal where its amplitude is high enough to be detected and also before LIA 200 is saturated. For example, two cases are given below for two different Din input signal levels, 5 mV and 200 mV. In both cases, the limit voltage of the LIA 200 is 800 mV and the gain of each amplifier stage A1–A9 is two (2).

| Ex. 1. Din = 5 mv | | Ex. 2 Din = 200 mV | |
|---|---|---|---|
| A1 | 10 mV | A1 | 400 mV |
| A2 | 20 | A2 | 800 |
| A3 | 40 | A3 | 800 |
| A4 | 80 | A4 | 800 |
| A5 | 160 | A4 | 800 |
| A6 | 320 | A6 | 800 |
| A7 | 640 | A7 | 800 |
| A8 | 800 | A8 | 800 |
| A9 | 800 | A9 | 800 |

In the first case, the input signal is relatively weak (5 mV) and therefore saturation is reached after A8. That is, each stage after A8 will output a 800 mV signal since this is the voltage limit of the LIA 800. However, in the second case, the input signal Din is stronger (200 mV) and saturation is reached after A1. Thus, when the input signal (Din) is small (e.g., 5–10 mv), the sampling point after the sixth A6 or seventh A7 stage may be desirable. However, if the input signal is large, 100–200 mv, the sampling point after the first A1 or second stage A2 is desirable since the LIA 200 may be saturated after that point.

One embodiment of the present invention as shown in FIG. 2 comprises multiple sampling points taken after each amplifier stage A1–A6. A plurality of peak detectors $210_1$–$210_6$ may be used at these multiple sampling points, the outputs of which serve as multiple inputs to the weighted multiple input, variable gain amplifier (WMI-VGA) 212. As noted above, the output of the amplifiers 204 as well as the output of the PDs 210 is typically non-linear for a given input. The WMI-VGA 212 is designed to compensate for this non-linearity as it samples over a broader range of the amplifier 204 outputs. In particular, the WMI-VGA 212 comprises a plurality of differential amplifiers $214_1$–$214_6$, one for each input from a corresponding PD 210. The nature of the differential amplifiers 214 tends to compensate for the non-linearity of the other amplifier stages and in the system. The gains of the individual differential amplifiers $214_1$–$214_6$ may be greater for the input signals corresponding to the earlier amplifier stages 204, and less gain for those signals corresponding to the later stages 204. In other words, for a given range, the gain of the individual differential amplifiers 214 may be inversely proportional to the gain of the input signal Din at its sampling point.

For ease of example, the gain values shown in FIG. 2 are normalized. As shown the gain of the differential amplifier $214_6$ that corresponds to the higher amplifier stage A6 may have a gain of only 1, while amplifier $214_5$ has a gain of 2, $214_4$ has a gain of 4, $214_3$ has a gain of 8, $214_2$ has a gain of 16, and finally, $214_1$ has the largest gain of 32 since it corresponds to the first amplifier stage A1 having the weakest signal output.

The outputs of each of the differential amplifiers $214_1$–$214_4$ may be combined or added, such as adder 217. The resultant output of the WMI-VGA 212 is a voltage signal comprising weighted signal strength information from a plurality of sampling points in the LIA 200 amplifier chain $204_{1-9}$. This output signal may then be compared to a threshold voltage by the comparator 219. If the combined signal is less than the threshold voltage, the LOS alarm signal 220 triggers. Using multiple sampling points allows accurate LOS detection over a wide range of Din input signals.

The gain or weighting of the differential amplifiers $214_{1-6}$ may be tuned or programmed by a user, according to the desired threshold for the LOS alarm 220. This may be accomplished for example with a variable resistor 216 that may be located off chip that internally controls the gain setting of the differential amplifiers $214_{1-6}$. Changing the gains of the differential amplifiers allows the user a method to program the desires threshold voltage of the LOS 202. For example, a table may be provided to the user to indicate the proper variable resistor setting for the desired LOS threshold voltage.

| Variable Resistor Setting | Corresponding LOS Threshold Voltage |
|---|---|
| 100 Ω | 200 mV |
| 200 Ω | 100 mV |
| 400 Ω | 50 mV |
| 4K Ω | 5 mV |

Of course this table and the values listed therein are only offered as an illustration. In practice many more values may be given offering a wide range of threshold voltage settings for the user to select from and different corresponding values may also be offered.

Embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A loss of signal (LOS) detection circuit, comprising:
   a plurality of detectors to detect a signal from a plurality of sampling points in an amplifier chain;
   a plurality of differential amplifiers for amplifying outputs of said plurality of detectors;
   an adder to add outputs of said plurality of differential amplifiers; and
   a comparator to compare an output of said adder to a threshold value and output an LOS alarm signal when said output of said adder is below said threshold value.

2. The LOS detection circuit as recited in claim 1 wherein said detectors are peak detectors.

3. The LOS detection circuit as recited in claim 1 wherein said plurality of differential amplifiers each have a different gain.

4. The LOS detection circuit as recited in claim 3 wherein the gain of each of said differential amplifiers is variable.

5. The LOS detection circuit as recited in claim 4, further comprising: a variable resistor to vary the gain of said plurality of differential amplifiers.

6. The LOS detection circuit as recited in claim 1 wherein said amplifier chain comprises a limiting amplifier circuit having a plurality of amplifier stages connected in series.

7. A limiting amplifier (LIA) having a loss of signal (LOS) circuit, comprising:
   a plurality of amplifier stages connected in series to progressively amplify an input signal;
   a plurality of sampling points after ones of said plurality of amplifier stages;
   a plurality of peak detectors each connected to one of said plurality of sampling points;
   a plurality of differential amplifiers each connected to receive an output from one of said plurality of peak detectors;
   a circuit to combine an output from each of said plurality of differential amplifiers to output a combined signal; and
   a comparator to output a LOS alarm signal when said combined signal is below a threshold value.

8. The LIA having a LOS circuit as recited in claim 7 wherein said plurality of differential amplifiers have different gains.

9. The LIA having a LOS circuit as recited in claim 8 wherein ones of said plurality of differential amplifiers corresponding to earlier ones of said plurality of amplifiers connected in series have higher gains.

10. The LIA having a LOS circuit as recited in claim 9, further comprising:
    a means for varying the gains of said differential amplifiers to program a desired LOS threshold voltage.

11. The LIA having a LOS circuit as recited in claim 9 wherein said means for varying comprises a variable resistor.

12. The LIA having a LOS circuit as recited in claim 7 wherein said plurality of differential amplifiers linearize signals output by said peak detectors.

13. A method for generating a loss of signal (LOS) alarm signal, comprising:
    sampling a signal at a plurality of sampling points after each of a plurality of amplifier stages; differentially amplifying sampled signals;
    combining said differentially amplified signals to produce a combined signal; and
    outputting an LOS alarm signal when said combined signal is below a threshold value.

14. A method for generating a LOS alarm signal as recited in claim 13 wherein each of said differentially amplified signals is amplified with a different gain.

15. A method for generating a LOS alarm signal as recited in claim 13 further comprising:
    varying the gain of the differentially amplified signals.

16. A method for generating a LOS alarm signal as recited in claim 13, further comprising:
    varying value of a variable resistor to vary the gain of the differentially amplified signals.

17. A method for generating a LOS alarm signal as recited in claim 13 wherein said combining comprises adding said differently amplified signals.

18. A method for generating a LOS alarm signal as recited in claim 13 further comprising: limiting a voltage output by said plurality of amplifier stages.

19. A method for generating a LOS alarm signal as recited in claim 14 further comprising:
    differentially amplifying weaker signals with a greater gain.

20. A method for generating a LOS alarm signal as recited in claim 16 further comprising:
    providing a table relating variable resistor values to LOS thresholds.

21. A method for generating a loss of signal (LOS) alarm signal as recited in claim 13, further comprising:
    selecting ones of said plurality of sampling points.

22. An amplifier circuit, comprising:
    a plurality inputs to receive a plurality of sampled signals;
    a plurality of differential amplifiers each connected to one of said plurality of inputs;
    an adder to add a signal output from each of said plurality of differential amplifiers to produce a combined signal;
    a limiting amplifier circuit comprising a chain of amplifier stages connected in series, wherein sampling points of each of said sampled signals are positioned after ones of said amplifier stages;
    a plurality of detectors positioned between said sampling points and said plurality of inputs; and
    a comparator to output an alarm signal when said combined signal is below a threshold value.

23. The amplifier circuit as recited in claim 22 wherein said plurality of inputs can be selected.

24. The amplifier circuit as recited in claim 22 wherein gains of each of said plurality of differential amplifiers is inversely proportional to a gain at a respective sampling point in said chain of amplifier stages.

25. The amplifier circuit as recited in claim 24, wherein said gains of each of said plurality of differential amplifiers is variable.

26. The amplifier circuit as recited in claim 25, further comprising:
    a variable resistor to vary said gains of said plurality of differential amplifiers.

* * * * *